United States Patent [19]

Wright

[11] Patent Number: 5,452,494

[45] Date of Patent: Sep. 26, 1995

[54] SEALING GROMMET

[75] Inventor: John O. Wright, York, Pa.

[73] Assignee: Osram Sylvania Inc., Del.

[21] Appl. No.: 238,287

[22] Filed: May 5, 1994

[51] Int. Cl.⁶ .................................................... F16L 5/00
[52] U.S. Cl. ............................................. 16/2; 174/153 G
[58] Field of Search ............ 16/2, 3; 174/152 R:152 A, 174/152 G, 65 G, 153 A, 153 G

[56]  References Cited

U.S. PATENT DOCUMENTS

| | | | |
|---|---|---|---|
| 2,225,472 | 12/1940 | Franklin | 16/2 |
| 2,375,373 | 5/1945 | Leathers | 174/153 G |
| 3,244,802 | 4/1966 | Sturtevant et al. | 174/153 G |
| 3,372,960 | 3/1968 | Fisher | 174/153 G |
| 4,041,241 | 8/1977 | Olmstead et al. | 174/153 G |
| 4,685,173 | 8/1987 | Pavur | 16/2 |
| 5,353,472 | 10/1994 | Benda | 16/2 |

Primary Examiner—P. Austin Bradley
Assistant Examiner—Chuck Y. Mah
Attorney, Agent, or Firm—William H. McNeill

[57] ABSTRACT

A sealing grommet for frictional fixation a wall comprises a substantially campanulate body with a closed end and an open end. A central portion is clamped to a cable. a peripheral flange is provided on an outer surface of the body. The hollow space existing between the internal surface of the open end and the central portion collapses during insertion thereby greatly reducing the necessary seating force.

3 Claims, 2 Drawing Sheets

SEALING GROMMET

TECHNICAL FIELD

This invention relates generally to grommets and more particularly to sealing grommets. Still more particularly, it relates to sealing grommets for bringing a radio antenna cable through the fire wall of an automotive vehicle.

BACKGROUND ART

Prior art sealing grommets have comprised relatively massive, solid, hemispherical components of a flexible material, such as rubber. The component would be provided with a groove for engaging the automotive vehicle fire wall and an extending flange preventing pull-through. Such grommets frequently required a setting force of up to 75 lbs. As the engine compartments of modern vehicles becomes more and more crowded with electronic components, it becomes more difficult to find the room necessary to be able to exert such pulling force.

DISCLOSURE OF THE INVENTION

It is, therefore, an object of this invention to obviate the disadvantages of the prior art.

It is another object of the invention to enhance sealing grommets.

It is yet another object of the invention to provide a sealing grommet with a reduced setting force.

These objects are accomplished, in one aspect of the invention, by a sealing grommet which comprises a substantially campanulate body which has an outer portion arrayed about a longitudinal axis. A central portion is also arrayed about the axis and is tubular. This arrangement defines a resilient hollow space between the outer portion and the central portion. A wall-engaging groove is provided adjacent a terminal end of the outer portion and there is a peripheral, extending flange adjacent the groove.

This construction allows the outer portion to collapse during insertion, greatly easing the task of fitting the grommet to the fire wall. No noticeable decrease in retention in the wall is present.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
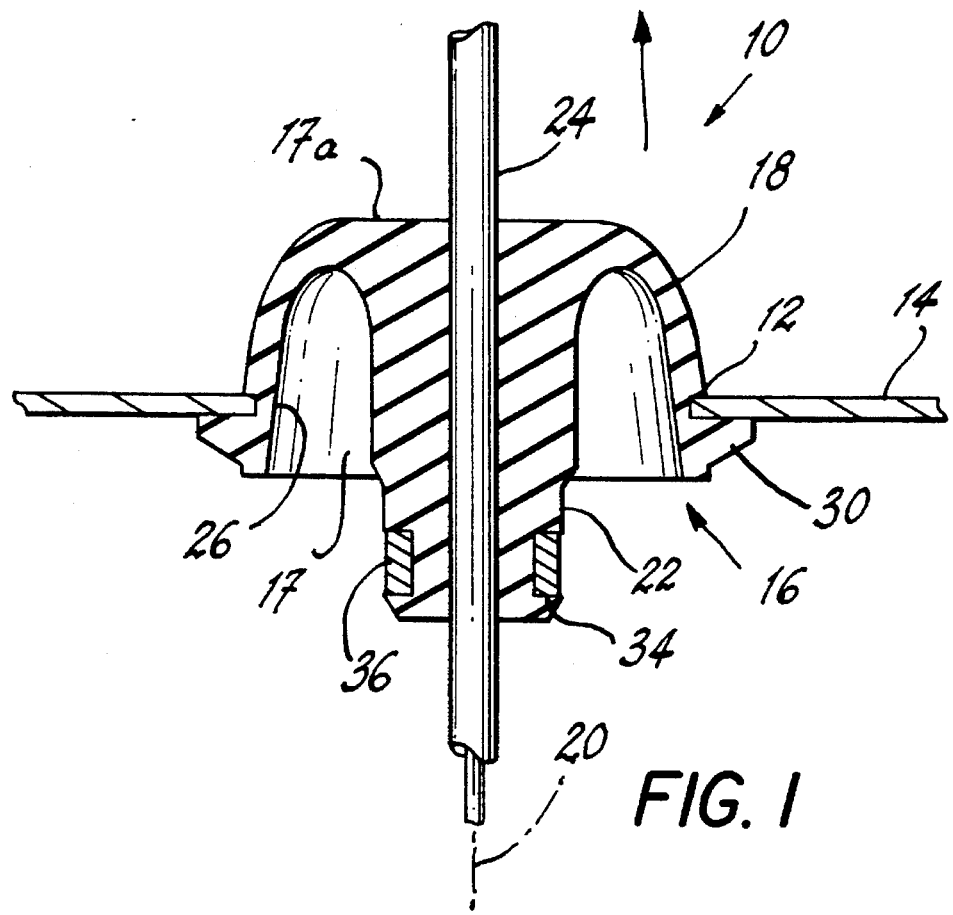
FIG. 1 is an elevational, sectional view of an embodiment of the invention.

Referring now to the drawings with greater particularity, there is shown in FIG. 1 a sealing grommet 10 frictionally fitted into an aperture 12 of a fire wall 14. Grommet 10 is substantially campanulate; i.e., it has a bell-shaped body 16 with an open end 17 and a closed end 17a with an outer portion 18 arrayed about a longitudinal axis 20 and is formed from a suitably resilient material. In a preferred embodiment of the invention, the material is SAE R4 15K butyl rubber.

A central portion 22 also is arrayed about axis 20. The central portion 22 is tubular for engaging an antenna cable 24 and has a diameter smaller than the internal diameter of the open end 17, thereby providing a hollow space therebetween. Portion 22 diagrammatically corresponds to the clapper of a bell.

A wall engaging groove 26 is formed adjacent an open end 17 of body 16 and at least one peripheral, extending flange 30 is positioned adjacent the groove 26.

The body 16 extends along the axis 20 for a given length and the central portion 22 extends along the axis 28 a distance greater than the given length to provide an extended portion which has a clamp receiving groove 34 formed therein. The extended portion 34 projects from and beyond the hollow space.

Figure 2:
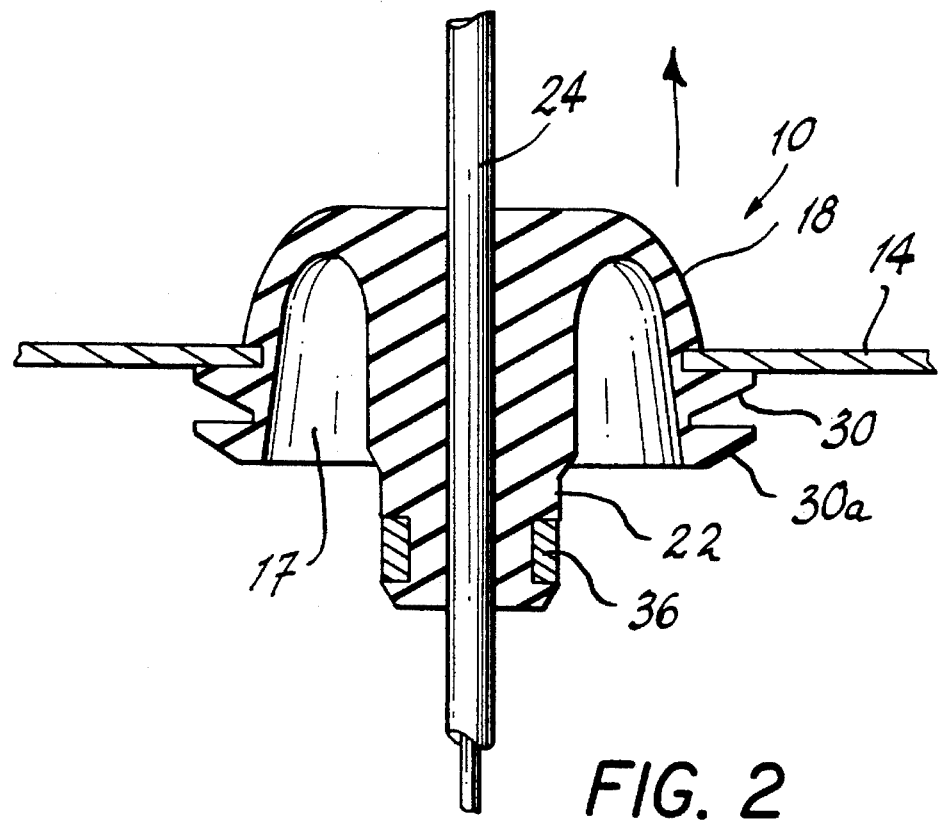
FIG. 2 is an elevational, sectional view of an alternate embodiment of the invention.
Figure 3:
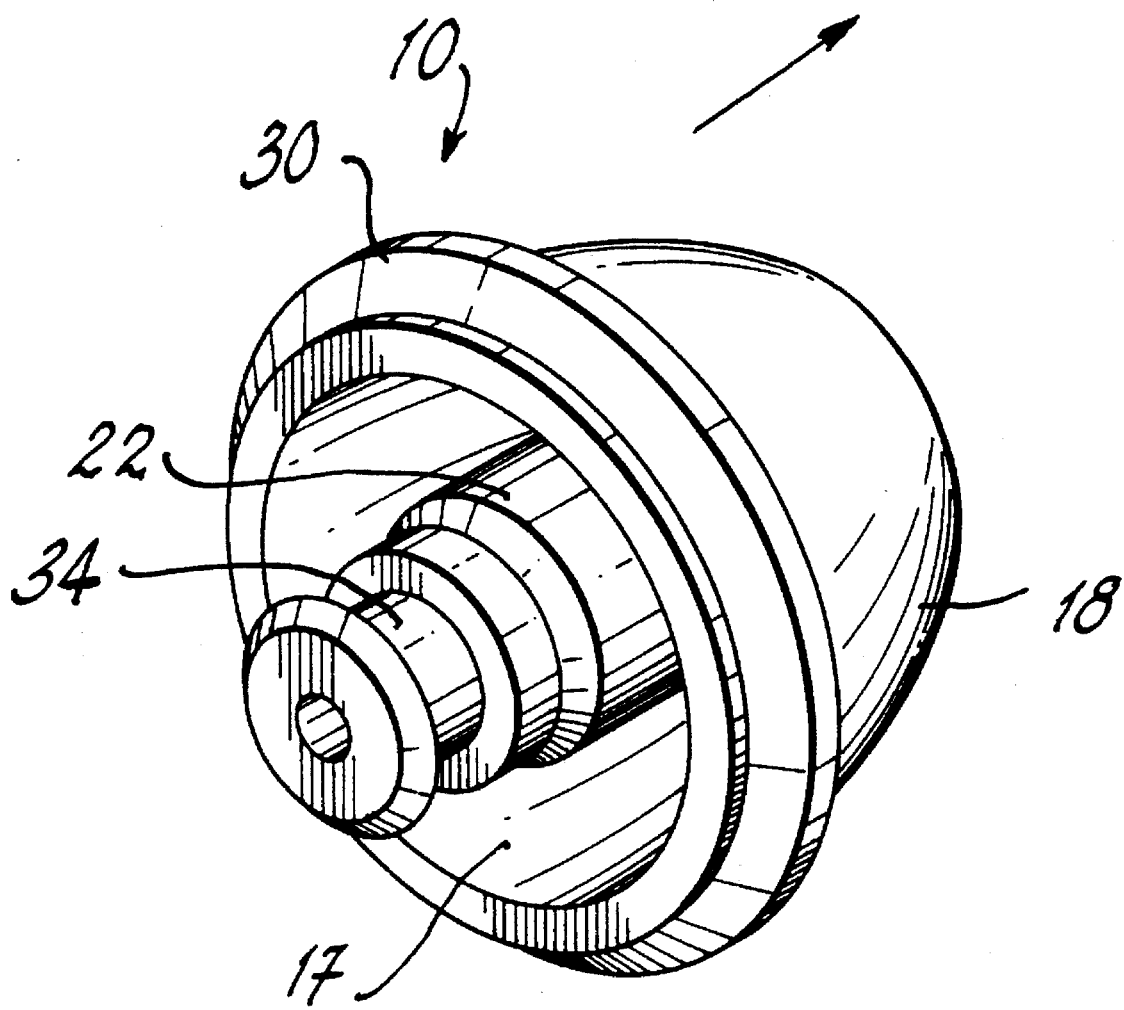
FIG. 3 is a perspective view of the embodiment of FIG. 1.

An alternate embodiment is shown in FIG. 2 wherein an additional extending flange 30a increases the pull-through resistance of the grommet.

In use, the grommet 10 is positioned in a desired location on cable 24 and fixed in that location by a clamp 36 installed in receiving groove 34. The cable 24 is then inserted through the aperture 12 and pulled until the grommet enters the aperture. Pulling direction is indicated by the arrows in the figures. Pulling continues until the grommet groove 26 seats around the edge of aperture 12. The hollow space of the grommet collapses during this operation to allow this seating to occur with much less force than was necessitated by the solid grommets of the past; however, the holding power of the grommet of this invention matches that of the solid grommets.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. A sealing grommet for frictional fixation in a wall, said grommet comprising: a substantially campanulate body with an open end and a closed end and having a resilient outer portion having a given length arrayed about a longitudinal axis; a central portion arrayed about said axis, said central portion being tubular and extending for a length greater than said given length to provide an extended portion, said extended portion being provided with a clamp receiving groove, and a hollow space between said outer portion and said central portion; a wall engaging groove formed adjacent a terminal end of said outer portion; and at least one peripheral, circumferential extending flange adjacent said groove.

2. The grommet of claim 1 wherein said extended portion projects from and beyond said hollow space.

3. The grommet of claim 1 wherein said at least one peripheral extending flange comprises two spaced apart flanges.

* * * * *